United States Patent
Lautenschläger

[19]

[11] Patent Number: 6,073,311

[45] Date of Patent: Jun. 13, 2000

[54] METAL FITTING FOR FURNITURE, WHICH CAN BE MOUNTED WITHOUT TOOLS IN A RECESS IN A FURNITURE PART, ESPECIALLY A STOP PART FOR A DOOR LEAF FOR FURNITURE HINGES

[75] Inventor: Horst Lautenschläger, Reinheim, Germany

[73] Assignee: MEPLA-Werke Lautenschläger GmbH & Co. KG

[21] Appl. No.: 09/163,699

[22] Filed: Sep. 30, 1998

[30] Foreign Application Priority Data

Sep. 30, 1997 [DE] Germany ............. 297 17 508 U

[51] Int. Cl.⁷ ............................................. E05D 5/02
[52] U.S. Cl. ................................................... 16/383
[58] Field of Search .................... 16/258, 257, 382, 16/383, 272; 403/297, 294, 292

[56] References Cited

U.S. PATENT DOCUMENTS

| | | | |
|---|---|---|---|
| 4,091,500 | 5/1978 | Lautenschlager et al. | 16/145 |
| 4,361,931 | 12/1982 | Schnelle et al. | 16/252 |
| 5,715,577 | 2/1998 | Lautenschlager et al. | 16/383 |

FOREIGN PATENT DOCUMENTS

| | | |
|---|---|---|
| 0610765 | 1/1994 | European Pat. Off. . |
| 0755640 | 5/1996 | European Pat. Off. . |
| 29507854 | 7/1995 | Germany . |
| 4437470 | 11/1995 | Germany . |
| 4427293 | 4/1996 | Germany . |
| 19517924 | 11/1996 | Germany . |
| 19521909 | 11/1996 | Germany . |
| 19527600 | 1/1997 | Germany . |

*Primary Examiner*—Anthony Knight
*Assistant Examiner*—Alison K. Pickard
*Attorney, Agent, or Firm*—Londa & Gluck LLP

[57] ABSTRACT

A metal fitting for furniture, which can be installed without tools in a recess in a panel-shaped furniture part. The metal fitting for furniture has a holding part, at the upper, free edge of which a radially protruding flange is provided, which can be guided in contact with the outside of the furniture part, and is provided with a clamping element, which can be propped open by a handle in clamping contact with the wall of the recess. The clamping element is constructed as a hoop, which extends over a portion of the height and a portion of the periphery of the holding part and, in its extent, is adapted essentially to the contour of the recess. On both sides of the hoop, lever shoulders, which are linked at the flange or in the vicinity of the flange at the holding part so that they can be swiveled about a common axis, are provided. The handle is linked so that it can be swiveled on the upper side of the flange about a swiveling axis, extending parallel to the swiveling axis of the hoop and, in the region of its pivotable mounting on the flange, in each case has a cam shoulder, which protrudes under the flange and engages in each case one of the cam counter-surfaces provided at the lever shoulders of the hoop.

15 Claims, 3 Drawing Sheets

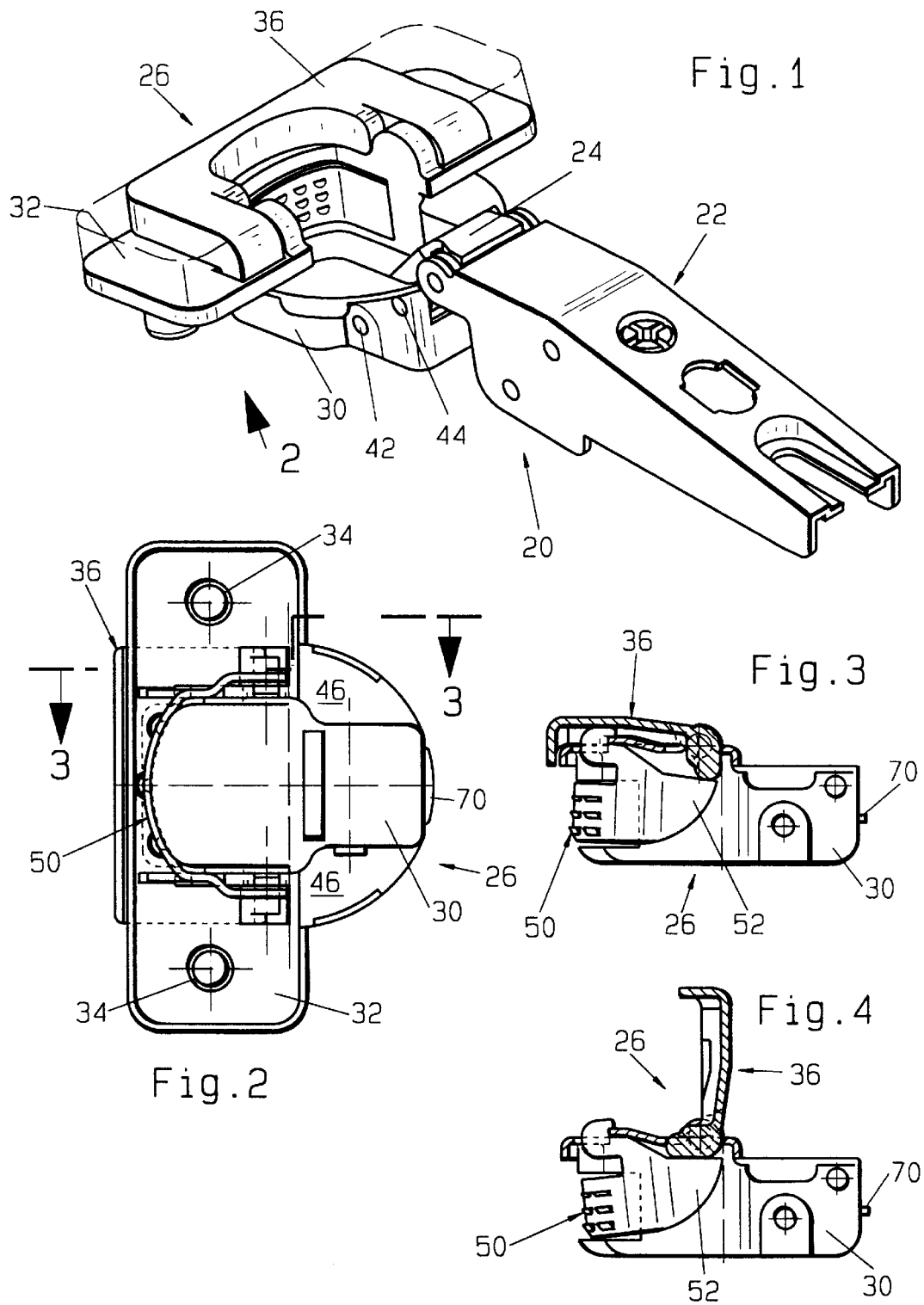

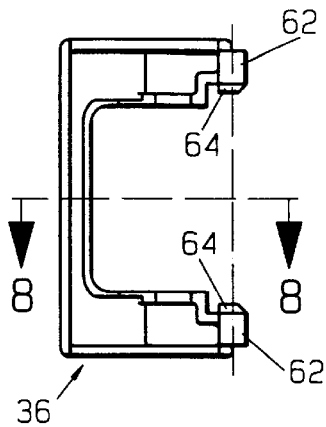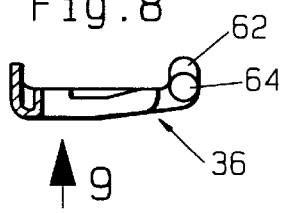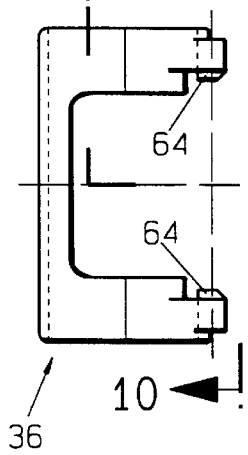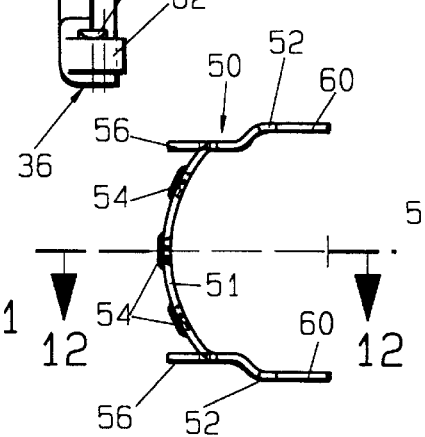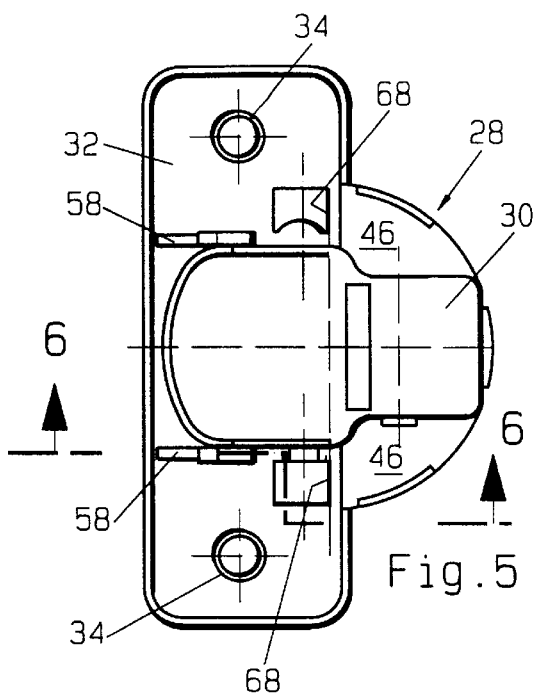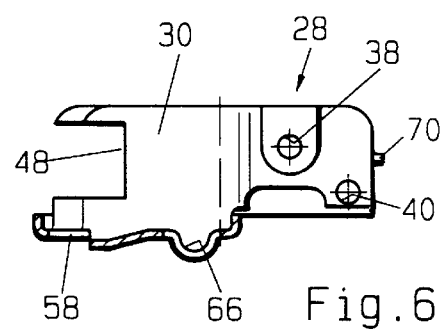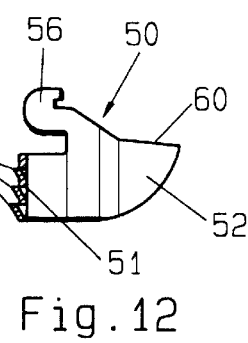

METAL FITTING FOR FURNITURE, WHICH CAN BE MOUNTED WITHOUT TOOLS IN A RECESS IN A FURNITURE PART, ESPECIALLY A STOP PART FOR A DOOR LEAF FOR FURNITURE HINGES

BACKGROUND OF THE INVENTION

1. Field of the Invention

The invention relates to a metal fitting for furniture, which can be installed without tools in a recess in a panel-shaped furniture part, with a holding part, which is dimensioned smaller than the recess and can be inserted in the recess and at the upper, free edge of which a radially protruding flange is provided, which can be guided in contact with the outside of the furniture part, and with a clamping element which, in the installed state, lies within the recess and can be propped open by a handle, which is disposed on the fastening flange and can be operated manually, essentially radially in clamping contact with the wall of the recess.

2. Description of the Related Art

Metal fittings for furniture, for which at least one holding part, fashioned as a fastening peg, is inserted in a recess or borehole in a panel-shaped furniture part and can be brought by means of a pivotably disposed handle into or out of clamping contact without a tool, are known (DE-195 27 600 C2).

Door leaf mounting parts of furniture hinges of this type, which are constructed as a plug-in pot and are to be installed countersunk in a recess in the rear of a door leaf, are also known (DE-195 21 909 A1). For these, a clamping element, which can swiveled radially towards the outside, is disposed on each of the two lateral flattenings of the trough part. In each case, they have a lever arm, which is joined to the fastening flange and disposed to point towards the outside. Their outer free ends are engaged in each case by a handle, which is mounted pivotably on the fastening flange. Depending on the position into which they have been swiveled, they can adjust, by way of the lever arms, the clamping elements between the swiveled-out fastening position and the swiveled-back release position of the stop part in the door leaf recess. The two clamping elements are put under tension by a retaining, ring-like, flat spiral spring in the release position. At its outer lateral edge regions facing the wall of the recess, this spiral spring is provided with pointed projections which, when the clamping elements are swiveled up, penetrate into the wall of the recess and thus ensure an additional positive locking of the stop part of the door leaf against leaving the recess. This stop part of the door leaf has been exceptionally serviceable in practice. However, as a result of the relatively complex structure, the manufacturing expenses and thus also the manufacturing costs are appreciable.

SUMMARY OF THE INVENTION

In view of the above, it is an object of the invention to provide a metal fitting part for furniture, especially a stop part for a door leaf for the type in question here which, due to its simplified structure, makes cost-effective production possible without affecting the simple and rapid, tool-less installation and dismantling or the secure anchoring in the installed state.

Starting out from a metal fitting part for furniture of the initially mentioned type, this objective is accomplished pursuant to the invention owing to the fact that the clamping element is constructed as a hoop, which extends over a portion of the height and a portion of the periphery of the holding part and, in its extent, is adapted essentially to the contour of the recess, on both sides of which hoop lever shoulders are joined and rest on the outside of the holding part, which are linked at the flange or in the vicinity of the flange at the holding part, so that they can be swiveled about a common axis, that the handle is linked so that it can be swiveled on the upper side of the flange about a swiveling axis, extending parallel to the swiveling axis of the hoop, between a position swiveled up from the flange and a position resting on the flange and that the handle, in the region of its pivotable mounting on the flange in each case has a cam shoulder, which protrudes under the flange and engages in each case a cam counter-surface provided at the lever shoulders of the hoop.

In an advantageous further development, intended as stop part of a door leaf for hinges, the metal fitting for furniture can be constructed so that the holding part is constructed in a known manner as a trough-like pot part, which is laterally flattened on both sides, with a fastening flange, which is joined in one piece to the upper edge of the pot part, rests in the intended installed position on the back of the respective door leaf and covers the door leaf recess at least partially, the metallic hoop being provided in the region of the wall region of the pot part which, in the intended installed position within the door leaf recess, is located opposite to the adjacent border edge of the door leaf and the flat lever shoulders, which are linked to the fastening flange or to the pot part and can be swiveled about a common axis, being passed over the outside of the lateral flattenings of the trough part.

At least that part of the hoop, which is adapted to the contour of the wall of the recess, can be disposed in a cut-out in the wall of the pot part.

Alternatively, this part of the hoop can, however, also be disposed on the outside of the wall of the pot part.

Advisably, the hoop, in its region, which can be brought into clamping contact with the wall of the recess in the door leaf, has an arc-shaped section, the outer radius of which corresponds to the recess in the door leaf, which is intended to accommodate the pot part.

In this connection, it is advisable to provide the outside of the hoop with holding teeth or holding ribs protruding toward the wall of a recess in the door leaf, intended to accommodate the pot part. The holding teeth or holding ribs thus penetrate into the wall and accordingly the door leaf mounting part is held by strictly ajamming action, that is, by friction, as well as additionally by a positive locking.

The hoop preferably is constructed by stamping it out of a sheet metal, a material being used which then, for example, by a suitable heat treatment, can be made spring hard when installed in the pot part.

The pot part and the fastening flange are also, preferably, stamped integrally out of sheet metal.

The lever shoulders on the hoop advisably in each case have a projecting hook, which passes through a slot in the fastening flange and embraces a boundary edge of the respective slot. The two projecting hooks thus bring about the pivotable supporting of the hoop at the fastening flange.

In a preferred embodiment of the invention, the handle has the shape of a low, U-shaped hoop plate, which is supported in the region of the free ends of its two U-shaped legs in each case pivotably on the fastening flange.

At the free ends of the U-shaped legs, peg-like projections are provided, which in each case engage a bearing seat constructed in the fastening flange.

Advantageously, the handle is formed as an integral, die cast metal part with an integrally cast cam shoulders, each of which is passed through a window in the fastening flange.

At the outside of the wall region of the pot part opposite the hoop, at least one projection, beveled into a point or a cutting edge, for example, in the form of rib extending in the peripheral direction, is advantageously provided. It also digs into the wall of the recess on the side opposite the hoop as a reaction to the gripping forces arising during the installation of the stop part of the door leaf between the hoop and the wall of the recess.

In order to ensure when dismantling is required that the hoop, when the handle is swiveled up, is also actually transferred from its gripping position into the release position, it is furthermore advisable to provide, at the handle and/or the hoop, restoring elements, which retract the hoop, when there is swiveling up into the swiveled-up position, positively from the gripping contact with the wall of the recess into a release position, in which it is retracted from the gripping position.

BRIEF DESCRIPTION OF THE DRAWINGS

In conjunction with the drawing, the invention is explained in greater detail in the following description of two examples. In the drawing, FIG. 1 shows a perspective view of a furniture hinge with a door leaf mounting part, which is constructed pursuant to the invention, FIG. 2 shows a view of the underside of the door leaf mounting part, which is made from sheet metal, seen in the direction of arrow 2 in FIG. 1, FIG. 3 shows a sectional view along the sectional plane indicated in FIG. 2 by arrows 3—3, FIG. 4 shows a sectional view, similar to that of FIG. 3, through the door leaf mounting part, in which, however, the handle is swiveled up into the release position, FIG. 5 shows a view from below, corresponding to that of FIG. 2, of the plug-in pot of the door leaf mounting part without the installed hoop and handle, FIG. 6 shows a sectional view through the plug-in pot shown in FIG. 5, the position of the section being indicated by the arrows 6—6 in FIG. 5, FIG. 7 shows a view of the underside of the handle of the plug-in pot shown in FIGS. 2 to 4, FIG. 8 shows a sectional view seen in the direction of arrows 8—8 in FIG. 7, FIG. 9 shows a plan view of the handle, seen in the direction of arrow 9 in FIG. 8, FIG. 10 shows a partially sectional view of the handle, seen in the direction of the arrows 10—10 in FIG. 9, FIG. 11 shows a view from below of the hoop, which is provided as clamping body of the door leaf mounting part, FIG. 12 shows a sectional view of the hoop, seen in the direction of arrows 12—12 in FIG. 11.

DESCRIPTION OF THE PREFERRED EMBODIMENTS

Figure 13:
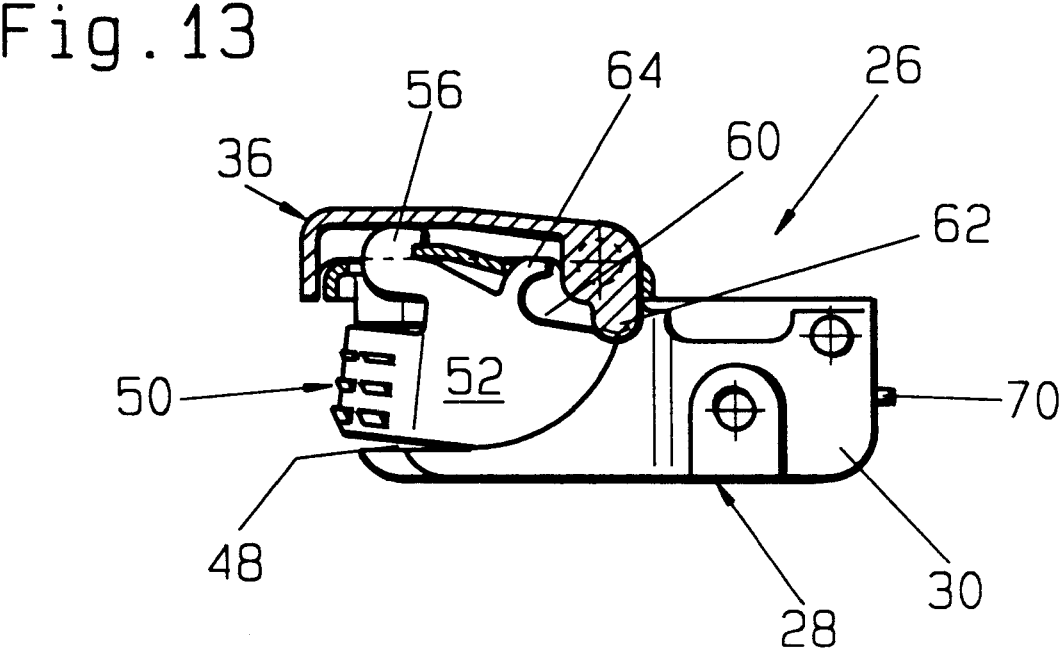
FIG. 13 shows a view, similar to that of FIG. 3, of a modified door leaf mounting part in the installed position with the handle swiveled down

A furniture hinge, which is labeled 20 as a whole, is shown diagrammatically in FIG. 1. For this hinge, a carcass mounting part, which is constructed as a long, stretched out bracket 22 and can be fastened adjustably to the side wall of a cupboard, wardrobe or cabinet, is connected over a joint mechanism formed by two hinge connecting levers, of which only one hinge connecting lever 24 is shown, with a door leaf mounting part 26, which is constructed in the inventive manner and countersunk in a recess in the back side of a door leaf, which is not shown. The door leaf mounting part 26 has a hinge pot or plug-in pot 28, which in the case shown is stamped out of sheet metal, can be shaped in the manner described below in conjunction with FIGS. 5 and 6 and held detachably at or in the door leaf by means of the clamping element described in conjunction with FIGS. 11 and 12. The door leaf mounting part 26, which forms the subject matter of the invention, is shown in FIGS. 2 to 4 and has a plug-in pot 28, which is composed of the actual pot part 30, which can be inserted countersunk in the recess (not shown) of the door leaf, and a fastening flange 32, which is disposed at the upper edge of the pot part 30, protrudes laterally on both sides and the underside of which, facing the door leaf, is seated on the inner surface of the door leaf when the plug-in pot 28 is installed. Centering pins 34, which engage assigned boreholes in the door leaf and are provided offset at a lateral distance from the actual pot part 30, protrude from the underside of the fastening flange 32. In the case shown, the centering pins 34 are stamped in one piece out of the material of the fastening flange and, since they are used only to align the rotation of the plug-in pot 26 relative to the neighboring border edge of the door leaf, that is, since they are not exposed to any stresses when the plug-in pot is installed, can have a relatively short length. On the upper side of the fastening flange, a handle 36 is provided in the form of a low hoop plate, which is U-shaped in plan view and is shown separately in FIGS. 7 to 10.

The actual pot part 30 of the actual plug-in pot 28, which pot part 30 is to be installed countersunk in the recess (not shown) in the back side of a door leaf, has the shape of a laterally flattened tub, in the side walls of which boreholes 38 and 40 are stamped, in which the ends of the hinge pins 42, 44 (FIG. 1), which support the hing connecting levers of the joint mechanism pivotably on the plug-in pot side, are provided. The fastening flange 32 laterally overlaps the recess in the door leaf, which usually has a circular boundary in plan view, and thus covers the space existing there between the pot part 30 and the wall of the recess. On the other hand, in the front region pointing towards the edge of the adjacent door leaf, to the right in FIG. 2, this space is closed off by sections 46 of the sheet metal of the hinge pot 28, which are bent from the upper edge of the pot part and have a circular boundary corresponding to the diameter of the recess, so that the recess in the door leaf is covered completely when the door leaf mounting part is installed.

In the region of the wall of the pot part, which is averted from the bracket 22 and which, in the intended installed position in the recess, points to the region of the wall of the recess opposite the leading edge of the door leaf, a cutout 48, which extends over the greater part of the height of the pot part in the circumferential direction, is provided. In the cutout 48, an arc-shaped section 51 of a hoop 50 is disposed, the shape of which corresponds approximately to that of the wall cutout 48 and which at both sides has flat lever shoulders 52, which pass over the outside of the lateral flattening of the trough part. The section 51 of the hoop, lying in the region of the recess, is provided with impressed holding teeth 54, which point radially to the outside towards the wall of the recess and which penetrate into the wall of the recess in the door leaf during the installation of the door leaf mounting part 26.

Flat, projecting hooks 56 extend upwards from the lateral lever shoulders 52 of the hoop 50, which is stamped out of springy sheet metal. Some of the projecting hooks 56 are passed through the slots 58 in the fastening flange and embrace a boundary edge of the respective slot 58. The upper boundary edge of the lever shoulders 52 is constructed at a distance below the projecting hooks 56 as a cam counter-surface 60 for in each case one cam shoulder 62, which is provided at the handle 36, which will be described below in connection with FIGS. 7 to 10. It can be seen already now that the hoop 50, installed as intended in the cutout 48 in a manner that can be seen best in FIGS. 3 and 4, is supported pivotably, that is, so that it can be forced out of or pulled back into the cut out 48, by the projecting hooks suspended in the slots 58. The swiveling process out of the cutout 48 into contact with the wall of a door leaf recess takes place due to the pressure on the cam counter surface 60 by means of a cam shoulder 62 for each cam counter surface 60. The cam shoulders 62 are provided directly next to the peg-like projections 64 at the free ends of the U-shaped legs of the plate-shaped handle 36, which is U-shaped in plan view. The peg-like projections 64, in turn, engage a bearing seat 66 formed in the fastening flange 32. The cam shoulders 62 grip through in each case one window 68 in the boundary flange 32 and rest on the cam counter-surface 60 of the hoop. In FIGS. 3 and 4, two different pivoting positions of the handle 36 are shown. It can be seen that, in the fastening position illustrated in FIG. 3, in which the handle 36 is swiveled down onto the boundary flange, the cam shoulder has pressed the cam counter surface 60 in the downwards direction, as a result of which the hoop 50 is forced out of the cutout 48. On the other hand, in the swiveled-up position of the handle 36 shown in FIG. 4, the hoop 50 can swing back into the interior of the pot part, as a result of which clamping contact with the wall of the door leaf recess is canceled and the pot part can be taken out of the recess.

In the wall region of the pot part 30 opposite the installed hoop 50, a low rib 70 is still provided, which is sharpened like a knife, extends in the peripheral direction, is pressed during the installation of the stop part 26 into the wall region of the recess near the leading edge as a result of the reaction forces arising during the swiveling-out of the hoop 50 and thus locks the pot part additionally and positively in the recess of the door leaf.

Figure 14:
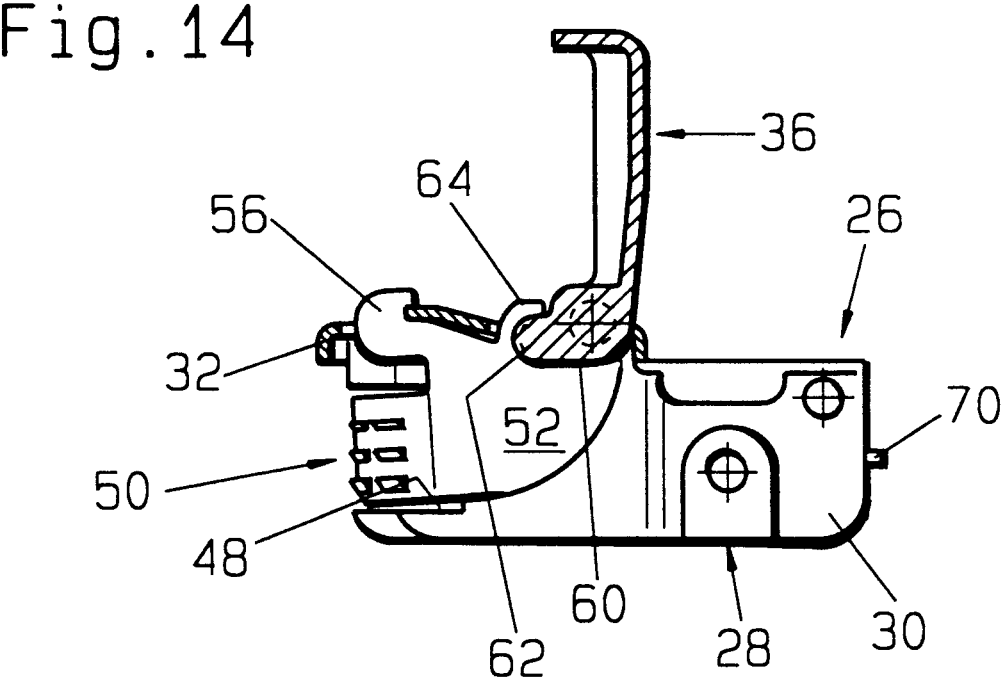
FIG. 14 shows a view of the modified door leaf mounting part, corresponding to FIG. 13, however with the handle swiveled into the release position.

In comparison to the door leaf mounting part 26 described above, the door leaf mounting part shown in FIGS. 13 and 14 is developed further only with respect to an additional coupling between the hoop 50 and the handle 36 in such a manner that, when the handle 36 is swiveled up, the hoop 50 is necessarily transferred from the radially swiveled-out clamping position into the swiveled-back release position. This further development is described below. To avoid repetitions, reference can be made to the previous description of the door leaf mounting part described in FIGS. 2 to 4, in regard to features, which are common to the two examples, particularly since the same reference symbols have been assigned to identical parts in the Figures.

The previously mentioned unavoidable return coupling between the handle 36 and the hoop 50 is attained owing to the fact that the cam counter-surfaces 60, which are provided at the lever shoulders 52, are rounded off upwards at their end facing the hoop 50 that is to be clamped and then change over into a hook-like projection 64 pointing back in the direction of the swiveling axis of the handle 36. When the handle 36 is swiveled up for the purpose of swiveling the hoop 50 back out of its clamped position into the release position, the cam shoulders 62 grip below the hook-like projections 64 and thus swivel the hoop 50 unavoidably in the counter-clockwise direction, as a result of which it is guided back from its radially protruding clamping position (FIG. 13) into the release position (FIG. 14) in the projection of the pot part 30.

It is evident that, within the scope of the inventive concept, modifications and further developments of the examples described can be realized. For example, the principle underlying the functioning of the tool-less locking by clamping, which has been described in connection with door leaf mounting parts for furniture hinges, can also be realized in other metal fittings for furniture, which are countersunk in recesses or boreholes, such as fastening pins or pegs of installation plates or metal connecting fittings.

Instead of the last-described unavoidable return of the hoop 50, it is also conceivable that additionally a spring, which places the hoop under tension in the release position and, when the handle is swiveled up, forces the hoop back into the release position, can be provided for the door leaf mounting part described in conjunction with FIGS. 2 to 4.

What is claimed is:

1. A metal fitting for furniture, which can be installed without tools in a recess in a panel-shaped furniture part, said metal fitting comprising:

a holding part smaller than the recess so that said fitting can be inserted in the recess;

a radially protruding flange provided at an upper free edge of said fitting, which can be guided in contact with the outside of the furniture part; and, a clamping element disposed on the fastening flange, said clamping element being arranged and constructed for manual operation by a handle to radially extend and engage in clamping contact with the wall of the recess, wherein the clamping element is constructed as a hoop (50), which extends over a portion of the height and a portion of the periphery of the holding part and, in its extent, is adapted essentially to the contour of the recess, said clamping element having on both sides hoop lever shoulders (52) which are joined and rest on the outside of the holding part, and are linked to the holding part (30), so that said hoop lever shoulders can be swiveled about a common axis, whereby the handle (36) is linked to the flange so that it can be swiveled on the upper side of the flange (32) about a swiveling axis that is parallel to the swiveling axis of the hoop (50), between a first position swiveled up from the flange and a second position resting on the flange and, whereby the handle (36), in the region of its link to the flange has a cam shoulder (62), which protrudes under the flange and engages a cam outer-surface (60) provided at the lever shoulders (52) of the hoop when the handle is in each of said first and said second positions.

2. The metal fitting for furniture of claim 1, wherein the holding part is constructed in a known manner as a trough-like pot part (30) laterally flattened on both sides, further comprising a fastening flange (32), which is joined in one piece to the upper edge of the pot part (30), and rests in the intended installed position on a back side of a respective door leaf having a recess sized to fit said metal fitting, said fastening flange covering the door leaf recess at least partially, so that the metallic hoop (50) is located opposite to the border edge of the door leaf and so that the flat lever shoulders (52) pass over the outside of the lateral flattenings of the trough part (30).

3. The metal fitting of claim 2, wherein the pot part (30) further comprises a recess opposite to the adjacent edge border of the door leaf in which the part of the hoop (50), the contour of which is adapted to the wall of the recess, is disposed.

4. The metal fitting of claim 2, wherein part of the hoop (50), the contour of which is adapted to the wall of the door leaf recess, is disposed on the outside of the wall of the pot part (30).

5. The metal fitting of claim 4, wherein the hoop (50), in its region that can be brought into clamping contact with the wall of the door leaf recess, has an arc-shaped section (51), the outer radius of which is essentially equal to the radius of the door leaf recess intended for accommodating the pot part (30).

6. The metal fitting of claim 5, wherein the hoop (50) is provided on an external side with the holding teeth (54) or holding ribs, which protrude towards the wall of the recess in the door leaf intended to accommodate the pot part (30).

7. The metal fitting of claim 6, wherein the hoop (50) is stamped out of sheet metal.

8. The metal fitting of claim 7, wherein the hoop (50) is spring hard in the state in which it is installed in the pot part (30).

9. The metal fitting of claim 8, wherein the pot part (30) and the fastening flange (32) are an integral part, stamped out of sheet metal.

10. The metal fitting claim 9, wherein the lever shoulders (52) on the hoop (50) in each case have a projecting hook (56), which passes through a slot (58) in the fastening flange (32) and embraces a boundary edge of the respective slot (58).

11. The metal fitting of claim 10, wherein the handle (36) has the shape of a low, U-shaped hoop plate, which is supported pivotably to the fastening flange (32) at a free end of each leg of said U-shared hoop.

12. The metal fitting of claim 11, wherein peg-like projections (64), which in each case engage a bearing seat (66) constructed in the fastening flange, are provided at the free ends of the U-shaped legs.

13. The metal fitting of claim 12, wherein the handle (36) is formed as an integral, die cast metal part with integrally cast cam shoulders (62), which in each case are passed through a window (68) in the fastening flange (62).

14. The metal fitting of claim 13, wherein from the outside of the wall region of the pot part (30) opposite the hoop (50), at least one projection (rib 70), beveled into a point or a cutting edge, protrudes.

15. The metal fitting of claim 14, wherein restoring elements are provided, which take along the hoop (50), when the handle (36) is swiveled into the swiveled-up position, positively from the clamping position assigned to the gripping contact with the wall of a recess into a release position, retracted from the gripping position.

* * * * *